United States Patent
Dinger

(10) Patent No.: US 9,841,059 B2
(45) Date of Patent: Dec. 12, 2017

(54) TORSIONAL VIBRATION DAMPER AND ARRANGEMENT AND METHOD FOR THE DAMPING OF A DRIVETRAIN OF A MOTOR VEHICLE

(71) Applicant: Schaeffler Technologies GmbH & Co. KG, Herzogenaurach (DE)

(72) Inventor: Christian Dinger, Lauf (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 431 days.

(21) Appl. No.: 14/410,926

(22) PCT Filed: Jun. 26, 2013

(86) PCT No.: PCT/EP2013/063396
§ 371 (c)(1),
(2) Date: Sep. 11, 2015

(87) PCT Pub. No.: WO2014/005903
PCT Pub. Date: Jan. 9, 2014

(65) Prior Publication Data
US 2016/0025147 A1    Jan. 28, 2016

(30) Foreign Application Priority Data
Jul. 6, 2012  (DE) .................. 10 2012 211 795

(51) Int. Cl.
| F16D 33/00 | (2006.01) |
| F16D 3/12 | (2006.01) |
| F16F 15/123 | (2006.01) |
| F16F 15/14 | (2006.01) |
| F16H 41/04 | (2006.01) |
| F16H 45/02 | (2006.01) |

(52) U.S. Cl.
CPC .......... *F16D 3/12* (2013.01); *F16F 15/12373* (2013.01); *F16F 15/145* (2013.01); *F16H 41/04* (2013.01); *F16H 45/02* (2013.01); *F16D 2300/22* (2013.01); *F16H 2045/0263* (2013.01)

(58) Field of Classification Search
CPC ............. F16H 45/02; F16H 2045/0231; F16H 2045/0263; F16D 3/12; F16F 15/12373
USPC .......................................................... 60/338
See application file for complete search history.

(56) References Cited

U.S. PATENT DOCUMENTS

2010/0269497 A1    10/2010  Engelmann et al.

FOREIGN PATENT DOCUMENTS

| CN | 1818415 | 8/2006 |
| CN | 102245936 | 11/2011 |
| DE | 102011102828 | 12/2011 |

(Continued)

*Primary Examiner* — Michael Leslie
(74) *Attorney, Agent, or Firm* — Simpson & Simpson, PLLC

(57) ABSTRACT

The invention relates to a torsional vibration damper, in particular a dual-turbine damper, for a drivetrain of a motor vehicle, preferably for a drivetrain of a motor vehicle having a hydrodynamic torque converter, having a first damper and a second damper connected to the latter in series, where the two dampers are situated essentially on a common circumference or essentially in a common plane of the torsional vibration damper, there being a damper intermediate mass connected between the two dampers connected in series, and a centrifugal pendulum device provided on the damper intermediate mass.

17 Claims, 1 Drawing Sheet

(56) References Cited

FOREIGN PATENT DOCUMENTS

| | | |
|---|---|---|
| DE | 102012219965 | 5/2013 |
| WO | 2011100945 | 8/2011 |

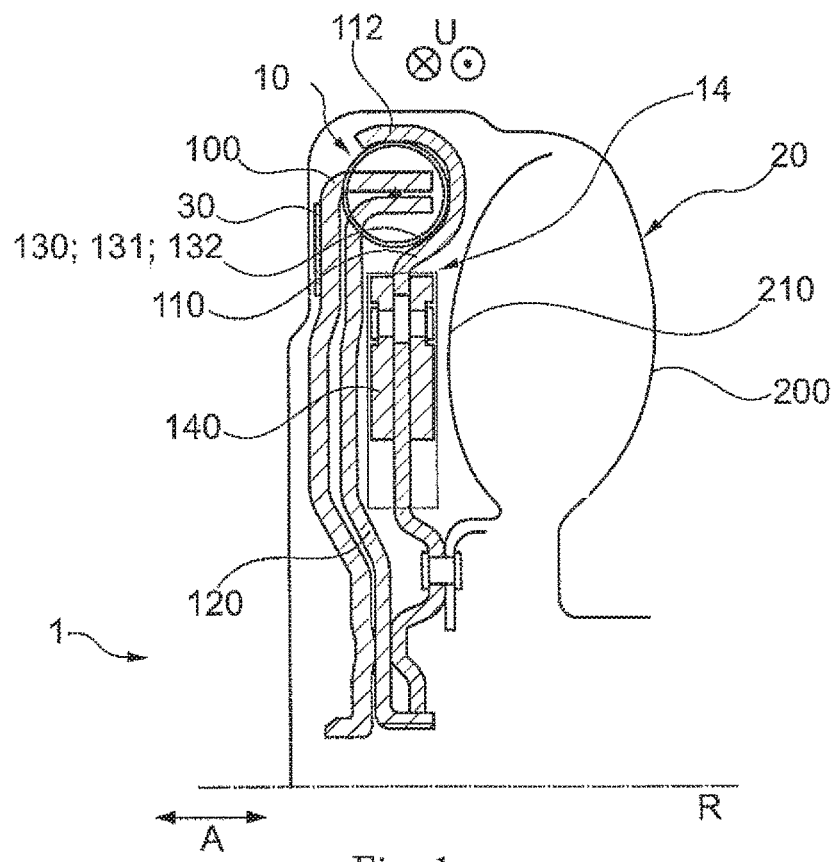
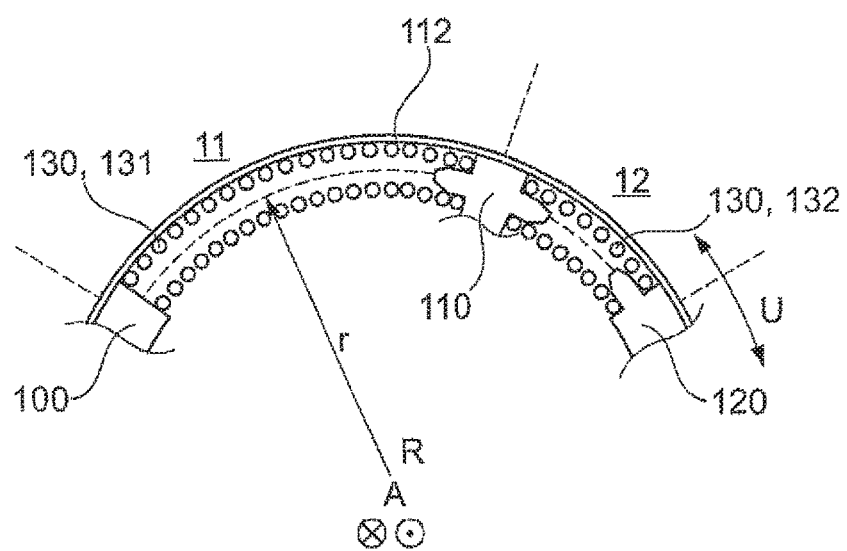

TORSIONAL VIBRATION DAMPER AND ARRANGEMENT AND METHOD FOR THE DAMPING OF A DRIVETRAIN OF A MOTOR VEHICLE

CROSS-REFERENCE TO RELATED APPLICATIONS

The present application is the U.S. national stage application pursuant to 35 U.S.C. §371 of International Application No. PCT/EP2013/063396, filed on Jun. 26, 2013, which application claims priority from German Patent Application No. DE 10 2012 211 795.4, filed on Jul. 6, 2012, which applications are incorporated herein by reference in their entireties.

TECHNICAL FIELD

The present invention relates generally to a torsional vibration damper, and, more specifically to a dual-turbine damper for a drivetrain of a motor vehicle and even more specifically, for a drivetrain of a motor vehicle having a hydrodynamic torque converter. The invention also relates to a system and a method for damping a drivetrain of a motor vehicle having a hydrodynamic torque converter and a torsional vibration damper assigned thereto. In addition, the present invention relates to a converter or a torque transfer device for a drivetrain of a motor vehicle.

BACKGROUND

On a crankshaft of a periodically operating internal combustion engine of a motor vehicle, superimposed irregularities of rotation occur during rotation of the crankshaft when the motor vehicle is in operation. The nature and/or frequency of the irregularities change with the speed of the crankshaft. Comparatively severe irregularities of rotation develop during operation of the motor vehicle as the torque of the internal combustion engine changes, i.e., as the demand for torque from a driver of the motor vehicle changes. Furthermore, torsional vibrations are excited in the drivetrain of the motor vehicle by combustion processes in the internal combustion engine, in particular in pulling mode. To reduce the irregularities of rotation in the drivetrain, a torsional vibration damper, possibly having a centrifugal pendulum device, may be employed. The torsional vibration damper can cancel out mainly the comparatively severe rotational irregularities, and the centrifugal pendulum device can cancel out mainly the periodic torsional vibrations above a rotational speed range of the internal combustion engine.

Typically, torsional or rotational vibration dampers are employed as damping devices in a motor vehicle between the internal combustion engine and the transmission. Thus, torsional vibration dampers may be employed in or on clutch plates of friction clutches, as dual-mass flywheels, or as torsional vibration dampers in or on torque converters. Centrifugal pendulum devices in such cases are often components of torsional vibration dampers, where a centrifugal pendulum device may belong to a turbine wheel of a hydrodynamic torque converter of an automatic transmission of the motor vehicle.

In general, torsional vibration dampers that have a plurality of damper stages have a large number of components, which makes their production time-consuming and expensive. Furthermore, axial construction space, of which little is available particularly in small vehicles, is causing more and more problems when designing a torsional vibration damper as a double damper, such as a dual-turbine damper. Here, not only are the spring elements of the torsional vibration damper offset axially relative to each other, but the pendulum masses of a centrifugal pendulum device are as well. This requires a large amount of axial construction space. Furthermore, an apportionment of spring segments in the case of double dampers without a centrifugal pendulum device is problematic, since a satisfactory solution of a damper apportionment of the double damper cannot be achieved for all rotational speed ranges.

SUMMARY

According to aspects illustrated herein, there is provided a torsional vibration damper for a drivetrain of a motor vehicle, the vibration damper having a first damper having a first energy storage element, a second damper having a second energy storage element and circumferentially displaced from the first damper and connected in series to the first damper, an intermediate mass connected in parallel between the first and second dampers, and, a centrifugal pendulum device having a plurality of pendulum masses attached to the intermediate mass.

According to aspects illustrated herein, there is provided a torque converter for a drivetrain of a motor vehicle having a cover arranged to receive torque, an impeller including an impeller shell non-rotatably connected to the cover, a turbine in fluid communication with the impeller, a stator located between the impeller and the turbine, and, a torsional vibration damper including a first damper having a first energy storage element, a second damper having a second energy storage element and circumferentially displaced from the first damper and connected in series to the first damper, an intermediate mass connected in parallel between the first and second dampers, and, a centrifugal pendulum device having a plurality of pendulum masses attached to the intermediate mass.

According to aspects illustrated herein, there is provided a method for damping a drivetrain of a motor vehicle having a hydrodynamic torque converter and a torsional vibration damper, the method having the steps of compensating for irregularities of rotation in the drivetrain during a pump operation of the torque converter with a first damper and a second damper connected in series with the torsional vibration damper, and compensating for irregularities of rotation in the drive train during a turbine operation of the torque converter.

A general object of the invention is to provide an improved torsional vibration damper, in particular an improved dual-turbine damper, for a drivetrain of a motor vehicle, preferably a drivetrain of a motor vehicle having a hydrodynamic torque converter, as well as a converter equipped therewith or a torque transmission device equipped therewith.

Another object of the invention is to provide an improved system and an improved method for damping a drivetrain of a motor vehicle.

Another object of the invention is to provide a torsional vibration damper with a simpler design.

Another object of the invention is to provide a torsional vibration damper that has a small axial construction space.

Another object of the present invention is to provide centrifugal pendulum device for a torsional vibration damper that requires a small axial construction space on or in the torsional vibration damper.

In an example embodiment, a torsional vibration damper has a first damper and a second damper connected in series thereto, where the two dampers are positioned on a common circumference and/or in a common plane of the torsional vibration damper, there being a damper intermediate mass interposed between the two series-connected dampers, and a centrifugal pendulum device preferably being provided on the damper intermediate mass.

In example embodiments, two-stage damping can be realized both in pump operation and in turbine operation of a torque converter. In pump operation of the torque converter, irregularities of rotation in the drivetrain can be compensated for by a first damper and a second damper of the torsional vibration damper, which are connected to the torsional vibration damper in series. In turbine operation of the torque converter, irregularities of rotation in the drivetrain can be compensated for by both the torque converter itself and by the second damper of the torsional vibration damper.

The converter according to the invention, or the torque transfer device according to the invention may be, for example, a rotational assembly, a torque converter, a damper device, a clutch, a clutch assembly, a turbine damper, a pump damper, a dual-mass converter and/or a dual-mass flywheel, and/or combinations thereof, having a hub if appropriate. In this case, the converter or torque transfer device has a torsional vibration damper according to the invention and/or a system according to the invention for damping a drivetrain of a motor vehicle. Furthermore, the converter or torque transfer device may be designed so that the method according to the invention is performable therewith.

In example embodiments of the invention, the damper intermediate mass of the torsional vibration damper is connected in a flow of operating power (or torque flow) of the torsional vibration damper mechanically after a damper input part and mechanically ahead of a damper output part. The energy storage elements of the two dampers can be provided in the circumferential direction of the torsional vibration damper essentially at a common radius or a common effective radius, preferably positioned interchangeably one after the other. A first energy storage element can be situated in a circumferential direction between the damper input part and the damper intermediate mass is in particular a first energy storage element, and situated between the damper intermediate mass and the damper output part is in particular a second energy storage element.

In the circumferential direction of the torsional vibration damper, a spring travel available to the damper input part relative to the damper intermediate mass can be greater than a spring travel of the damper intermediate mass relative to the damper output part, while a quotient of the spring travel of the damper input part relative to the damper intermediate mass in reference to the spring travel of the damper intermediate mass relative to the damper output part in a neutral position of the torsional vibration damper is approximately 50/50 to approximately 85/15, in particular approximately 65/35 to approximately 75/25. The first energy storage element of the torsional vibration damper can be formed between the damper input part and the damper intermediate mass as a long compression spring in comparison to the second energy storage element, in particular a long bow compression spring. Furthermore, the second energy storage element can be formed between the damper intermediate mass and the damper output part as a short compression spring, in particular a short bow compression spring or a short linear compression spring.

In example embodiments of the invention, the damper input part, the damper intermediate mass and/or the damper output part have a lug or pin in the circumferential direction on one or both sides facing the energy storage elements, which engages with the longitudinal end section of the applicable energy storage element. The applicable damper input part, the applicable damper intermediate mass and/or the applicable damper output part, or the respective lug or respective pin can be designed so that at least the applicable longitudinal end section of the energy storage element is at a distance from a guideway in a retainer of the torsional vibration damper when the torsional vibration damper is operating. In this case, it is preferred to design the applicable lugs or pins of the second damper so that the energy storage element of the second damper also in operation has essentially no contact with the retainer of the torsional vibration damper. In this case, the energy storage element of the second damper in particular may be designed as a linear compression spring.

In example embodiments of the invention, the retainer is provided on the damper intermediate mass, which is preferably designed as a damper intermediate flange, the retainer being fastened to the damper intermediate flange, materially joined to the damper intermediate flange in a single piece, or integrally formed with the damper intermediate flange. That is, the damper intermediate flange or damper intermediate mass may be designed as a bow spring retainer, which preferably braces all energy storage elements in a radial direction of the torsional vibration damper, at least toward the outside. In this case, there should be as little mechanical contact of the particular energy storage element with the retainer as possible.

In example embodiments of the invention, the centrifugal pendulum device of the damper intermediate mass is received comparatively centrally within the torsional vibration damper. In this case, the centrifugal pendulum device may be received within an axial external dimension of the torsional vibration damper on/in the torsional vibration damper. Furthermore, the centrifugal pendulum device may be received in the axial direction essentially within an axial external dimension of the energy storage elements on/in the torsional vibration damper. It is possible here to center the centrifugal pendulum device in the axial direction in relation to the energy storage elements located outside; that is, an average radius of the energy storage elements is located essentially in a center plane of the centrifugal pendulum device.

In addition, a second energy storage element can be braced in the circumferential direction on the damper input part on a side located opposite the first energy storage element, whereas in the circumferential direction on the damper output part on a side located opposite the second energy storage element, a first energy storage element can be braced. Furthermore, the damper input part may be designed as an input flange and, in particular, as a piston plate, and/or the damper intermediate flange or damper intermediate mass may be designed as a bow spring retainer, which preferably braces all energy storage elements in a radial direction of the torsional vibration damper, at least toward the outside. Moreover, the damper intermediate flange, the damper intermediate mass or the bow spring retainer may be designed as an oscillating mass flange, and/or the damper output part may be designed as a hub flange which is provided on a hub, or which is formed materially in a single piece or integrally with a hub.

These and other objects, advantages and features of the present invention will be better appreciated by those having ordinary skill in the art in view of the following detailed description of the invention in view of the drawings.

BRIEF DESCRIPTION OF THE DRAWINGS

The invention will be explained in greater detail in the following section on the basis of exemplary embodiments in combination with the appended drawing. In the drawings the figures show the following:

FIG. 1 is a partially detailed cross-sectional view of a torque converter with a torsional vibration damper according to the present invention shown in detail; and, FIG. 2 is a top view of the torsional vibration damper according to the invention from FIG. 1, wherein only a sector-shaped detail of the torsional vibration damper is depicted, and the turbine hub is not depicted.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

FIGS. 1 and 2 illustrate an approximately 120° sector of an exemplary embodiment of torsional vibration damper 10 according to the invention. Vibration damper 10 may be for a hydrodynamic torque converter in drivetrain 1 of a motor vehicle. Aside from torsional vibration damper 10 itself, and the schematically depicted torque converter 20, drivetrain 1 is represented in the drawing only by its axis of rotation R. However, the invention is not limited to the depicted torsional vibration damper 10 or a depicted use of torsional vibration damper 10, but rather can be applied to all torsional vibration dampers 10 of motor vehicles, for example on a converter, a clutch, or quite generally in the drivetrain 1. The motor vehicle may be a commercial vehicle, a bus, a construction machine, a motorcycle, etc.

In an example embodiment, torsional vibration damper 10 is a dual-turbine damper. Dual-turbine damper 10 has two dampers 11 and 12 arranged in series, and has only three flanges 100, 110, 120. In an example embodiment, damper input part 100 is designed as an input flange, which may also be formed as a piston plate. Damper intermediate mass 110 is designed as a damper intermediate flange, and damper output part 120 is designed as a hub flange.

Each flange 100, 110, and 120 can be a constituent part of a component within the torque converter, a constituent part of an integrally formed component, a separate component by itself, a component itself comprised of constituent parts, an integrally formed component comprised of constituent parts, or as its own piece within the torque converter. Furthermore, damper output part 120 may be mounted on a hub of a transmission input shaft (both not shown in the drawing), or formed with the hub in a single piece, materially in a single piece or integrally. The transmission input shaft, torsional vibration damper 10 and torque converter 20 (and, thus, the torque converter's impeller 200 and turbine 210) are rotatable around axis of rotation R of drivetrain 1.

During operation of the motor vehicle, damper output part 120 of torsional vibration damper 10 transfers to the transmission input shaft either a drive torque coming from an internal combustion engine (not shown in the drawing) from impeller 200 or from turbine wheel 210 of torque converter 20, depending on a position of a clutch, of which only a friction lining 30 is shown. In the first case, with the drive torque coming from impeller 200, the drive torque is introduced through friction linings 30 then is transmitted through the components in the following order: to damper input part 100, then first damper 11, then damper intermediate mass 110, then second damper 11, to the damper output part 120 and from there into the transmission input shaft. In this case, friction linings 30 may be the friction linings of a dry or wet running clutch. Furthermore, instead of friction linings 30, friction linings of a multi-plate clutch (not shown in the drawing) may also be employed. In the second case, with the drive torque coming from the turbine wheel 210, the drive torque is introduced through damper intermediate mass 110 and second damper 11 to damper output part 120, and from there into the transmission input shaft, for which purpose turbine wheel 210 is connected to damper intermediate mass 120 in a rotationally fixed connection, indirectly or directly.

In an example embodiment, damper intermediate mass 110 has retainer 112, which may be formed with damper intermediate mass 110 as a constituent part of a component, a constituent part of an integrally formed component, a separate component by itself, a component itself comprised of constituent parts, an integrally formed component comprised of constituent parts, or as its own piece. In this case, retainer 112 or damper intermediate mass 110 is designed as bow spring retainer 110, which receives energy storage elements 130; 131, 132 of torsional vibration damper 10 (see FIG. 2). Here, energy storage elements 130; 131, 132 are designed as compression springs 130; 131, 132, where energy storage element 130, 131 is preferably designed as bow compression spring 130, 131, and energy storage element 130, 132 is preferably designed as bow compression spring 130, 132 or a linear compression spring (not shown in the drawing). Furthermore, it is preferred that compression spring 130, 131 is designed as a comparatively long and/or soft compression spring 130, 131, and compression spring 130, 132 designed as a comparatively short and/or hard compression spring 130, 132.

So that energy storage elements 130; 131, 132 cause the least possible friction within retainer 112, preferably in each case one or both longitudinal end sections of energy storage elements 130; 131, 132 are provided at an interval from the inner surface of retainer 112, as depicted in FIG. 2 with bow compression spring 130, 132 on both sides and with bow compression spring 130, 131 on one side. This is preferably accomplished by means of a lug or pin on the applicable flange 100, 110, 120 within retainer 112, which engages with a longitudinal end of the applicable compression spring 130;

131, 132. In particular with comparatively short bow compression springs 130, 132, it is possible in this way to keep bow compression springs 130, 132 at a distance from the inner surface of retainer 112 over their entire length, and also in all operating conditions of torsional vibration damper 10. Furthermore, it is possible to replace a comparatively short bow compression spring 130, 132 with a linear compression spring, and thus to reduce the problem of the friction within retainer 112.

As already mentioned above, torsional vibration damper 10 according to the invention has two dampers 11, 12. In this case, first damper 11 is set up between damper input part 100 and damper intermediate mass 110, and preferably has three comparatively long energy storage elements 130, 131. Furthermore, second damper 12 is set up between damper intermediate mass 110 and damper output part 120, and preferably also has however three comparatively short energy storage elements 130, 132. It is of course possible in each case to provide a different number of energy storage elements 130; 131, 132. To that end, a correspondingly greater or smaller number of flange projections are then necessary, which engage with retainer 112 between energy storage elements 130, 131, 132. In the present case, each of flanges 100, 110, 120 has three such flange projections. (In this connection see the flange projections or laps (no reference labels) situated in the region of energy storage element 130, 131, 132 of FIG. 1).

Furthermore, damper intermediate mass 110 has centrifugal force pendulum 14 or centrifugal pendulum device 14, which is preferably received within torsional vibration damper 10 and is preferably located radially within energy storage elements 130, 131, 132 of torsional vibration damper 10. That is, centrifugal pendulum device 14 preferably does not form a radial (r) outer limit and/or no axial (A) outer limit of torsional vibration damper 10. This is intended to relate in particular to pendulum masses 140 of centrifugal pendulum device 14. In this case, damper intermediate mass 110 is designed not only as bow spring retainer 110, but also as pendulum flange 110 or pendulum mass flange 110. This also means that damper intermediate mass 110 is non-rotatably connected to retainer 112, turbine wheel 210 and centrifugal pendulum device 14, where these rotate during operation of the motor vehicle at the same angular speed (aside from the pendulum masses of centrifugal pendulum device 14). In this case, damper intermediate mass 110 can be supported sliding radially inside and axially on damper output part 120.

Centrifugal pendulum device 14 is based on the principle that because of "centrifugal force" its pendulum masses 140 attempt to revolve around axis of rotation R at the greatest possible distance when a rotary motion is introduced. Of course, when referring to the dynamics of an object, "centrifugal force" is merely a name given for the absence or partial absence of centripetal force acting on that object in a non-Newtonian reference frame (i.e., an accelerating or rotating reference frame) which, applied here, results in pendulum masses 140 revolving around axis of rotation R at the greatest possible distance when a rotary motion is introduced. The torsional vibrations of the crankshaft result in an oscillating relative motion of the pendulum masses 140, while centrifugal pendulum device 14 has a natural frequency proportional to the speed of rotation, so that torsional vibrations having frequencies that are proportional in the same way to the rotational speed of the crankshaft can be canceled out over a greater rotational speed range.

Centrifugal pendulum device 14 comprises a plurality of pendulum masses 140 distributed in circumferential direction U, which are attached to damper intermediate mass 110 by means of guide elements and are able to carry out a relative motion in relation to damper intermediate mass 110 along specified guideways, in order to thereby be able to assume a variable interval in radial direction r from axis of rotation R of damper intermediate mass 110. As a consequence of the torsional vibrations in drivetrain 1, pendulum masses 140 are excited to oscillation or vibration, while their centers of mass change constantly and time-shifted relative to the torsional vibrations in drivetrain 1, which causes a damping of the torsional vibrations due to mechanical feedback. An efficient damping can be achieved through appropriate coordination of pendulum masses 140 and their guideways.

In summary, when the clutch is engaged, the drive torque, coming from impeller 200, is transferred through friction linings 30 to piston plate 100. In a multi-plate clutch it is of course possible to connect a plate carrier (both of them not shown in the drawing) to piston plate 100 or damper input part 100. Piston plate 100 introduces the drive torque into first damper 11. Through a driver in bow spring retainer 110 or damper intermediate mass 110, the drive torque is transferred to second damper 12 which is connected in series, and by means of hub flange 120 or damper output part butting against second damper 12 is channeled away from torsional vibration damper 10. In order to further isolate a turbine torque, turbine wheel 210 is connected to bow spring retainer 110.

In addition, centrifugal force pendulum 14 is attached to bow spring retainer 110 or damper intermediate mass 110. To improve the effect of centrifugal force pendulum 14, it is possible to vary the lengths and/or sector distribution of dampers 11, 12. Bow spring retainer 110 or damper intermediate mass 110, as well as hub flange 120 or damper output part 120, are provided with lugs, which mesh with second damper 12 and brace the latter radially outward under rotation, whereby friction between second damper 12 and bow spring retainer 110 can be reduced. It is likewise possible to attach part of first damper 11 essentially friction-free through a driver on bow spring retainer 110.

According to the invention, a damper system, a damper device 1 or torque transfer device 1 having a combination of centrifugal pendulum device 14 and torsional vibration damper 10 is made available. In an example embodiment of damper device 1, centrifugal pendulum device 14 and torsional vibration damper 10 are arranged so that construction space in axial direction A of drivetrain 1, and also components, is saved. The lengths of first damper 11 and second damper 12 can be coordinated by a distribution in circumferential direction U of torsional vibration damper 10, or around axis of rotation R, depending on use; for example, in a ratio of approximately 50/50 to approximately 85/15, in particular from approximately 65/35 to approximately 75/25. In order to also attain good vibration isolation in a turbine operation or turbine mode, it makes sense for damper 12 to be as friction-free as possible. Furthermore, the structural design of damper device 1 is comparatively simple.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE LABELS 1 drivetrain of a motor vehicle, in particular having a hydrodynamic torque converter (only partially depicted in the drawing)
10 torsional vibration damper, damper device, torque transfer device, dual-turbine damper
11 (first) damper of the torsional vibration damper 10
12 (second) damper of the torsional vibration damper 10
14 centrifugal pendulum device, centrifugal force pendulum
20 (hydrodynamic) torque converter (depicted schematically in the drawing without guide wheel)
30 friction lining of a (dry or wet running) clutch (not depicted in the drawing), friction linings (likewise not depicted in the drawing) of a multi-plate clutch
100 damper input part; input flange, piston plate
110 damper intermediate mass; damper intermediate flange, bow spring retainer, pendulum (mass) flange with retainer 112, turbine wheel 210 and centrifugal pendulum device 14
112 retainer
120 damper output part, hub flange
130 energy storage element; compression spring; bow compression spring, linear compression spring (not depicted in the drawing)
131 (first) energy storage element of the first damper 11, comparatively long or soft compression spring
132 (second) energy storage element of the second damper 12, comparatively short or hard compression spring
140 pendulum mass of the centrifugal pendulum device 14
200 pump, impeller of the torque converter 20
210 turbine, turbine wheel of the torque converter 20
A axial direction of drivetrain 1, torsional vibration damper 10, torque converter 20, transmission input shaft (not depicted in the drawing)
R axis of rotation of drivetrain 1, torsional vibration damper 10, torque converter 20, transmission input shaft
r (mean) radius of the energy storage elements 130; 131, 132, effective radius of the torsional vibration damper 10; radial direction toward the outside
U circumferential direction of drivetrain 1, torsional vibration damper 10

What is claimed is:

1. A torsional vibration damper for a drivetrain of a motor vehicle, the vibration damper comprising:
    a first damper having a first energy storage element;
    a second damper having a second energy storage element and circumferentially displaced from the first damper and connected in series to the first damper;
    an intermediate mass connected in parallel between the first and second dampers; and,
    a centrifugal pendulum device having a plurality of pendulum masses attached to the intermediate mass and arranged radially inward of the first energy storage element.

2. The torsional vibration damper of claim 1, further comprising:
    an input;
    an output; and,
    a torque flow wherein the input is driven by a driving torque, the input transmits the torque to the intermediate mass through the first energy storage unit, and the intermediate mass transmits the torque to the output through the second energy storage element.

3. The torsional vibration damper of claim 2, further comprising a retainer having a guideway, wherein the input, the intermediate mass and/or the output has in a circumferential direction on one or both sides a lug or a pin, which engages with a longitudinal end section of the applicable energy storage element, and/or the applicable input, the applicable intermediate mass and/or the applicable output, or the respective lug or respective pin are designed so that at least the applicable longitudinal end section of the applicable energy storage element when the torsional vibration damper is operating is at a distance from the guideway.

4. The torsional vibration damper of claim 3, wherein the retainer is arranged on the intermediate mass.

5. The torsional vibration damper of claim 4, wherein the retainer is fastened to the intermediate mass, materially joined to the intermediate mass, or integral with the intermediate mass.

6. The torsional vibration damper of claim 1, wherein in a neutral position:
    the input has a first spring travel in a circumferential direction;
    the intermediate mass has a second spring travel less than the first spring travel; and,
    a quotient of the first spring travel in relation to the second spring travel is within the range of 51/49 to 85/15.

7. The torsional vibration damper of claim 6, wherein the quotient is within the range of 65/35 to 75/25.

8. The torsional vibration damper of claim 7, wherein the quotient is approximately 70/30.

9. The torsional vibration damper of claim 6, wherein the quotient is approximately 75/25.

10. The torsional vibration damper of claim 6, wherein the quotient is approximately 80/20.

11. The torsional vibration damper of claim 1, wherein the first and second energy storage elements are each a compression spring.

12. The torsional vibration damper of claim 1, wherein the first energy storage element is a first compression spring having a first circumferential length, the second energy storage element is a second compression spring having a second circumferential length less than the first circumferential length.

13. The torsional vibration damper of claim 1, wherein the first and second energy storage elements are each a bow compression spring.

14. The torsional vibration damper of claim 1, wherein the centrifugal pendulum device is configured comparatively centrally within the torsional vibrational damper, received on/in the torsional vibration damper within an axial external dimension of the torsional vibration damper, and/or the centrifugal pendulum device is received on/in the torsional vibration damper in an axial direction of the torsional vibration damper essentially within an axial external dimension of the energy storage elements.

15. The torsional vibration damper according to claim 1, further comprising an input flange and an output, wherein:
    the second energy storage element is braced in a circumferential direction on the input on a first side located opposite the first energy storage element;
    the first energy storage element is braced in the circumferential direction on the output on a second side located opposite the second energy storage element;
    the intermediate mass is a bow spring retainer and arranged to brace all energy storage elements in the radial direction, at least toward the outside; and,
    the output is a hub flange which is provided on a hub or which is designed materially in a single piece integrally with the hub.

16. A torque converter for a drivetrain of a motor vehicle, comprising:

a cover arranged to receive torque;
an impeller including an impeller shell non-rotatably connected to the cover;
a turbine in fluid communication with the impeller;
a stator located between the impeller and the turbine; and,
a torsional vibration damper comprising:
   a first damper having a first energy storage element;
   a second damper having a second energy storage element and circumferentially displaced from the first damper and connected in series to the first damper;
   an intermediate mass connected in parallel between the first and second dampers; and,
   a centrifugal pendulum device having a plurality of pendulum masses attached to the intermediate mass and arranged radially inward of the first and second energy storage elements.

17. A method for damping a drivetrain of a motor vehicle having a hydrodynamic torque converter and a torsional vibration damper, the method comprising the steps of:
   compensating for irregularities of rotation in the drivetrain during a pump operation of the torque converter with a first damper and a second damper connected in series with the torsional vibration damper and arranged radially outward of an intermediate mass; and,
   compensating for irregularities of rotation in the drive train during a turbine operation of the torque converter with the torque converter itself and the second damper of the torsional vibration damper.

* * * * *